(12) United States Patent
Confer et al.

(10) Patent No.: US 6,729,265 B2
(45) Date of Patent: May 4, 2004

(54) SUPPLEMENTED ANTIBODY FEED TO ENTER THE CIRCULATING SYSTEM OF NEWBORNS

(75) Inventors: Leslie A. Confer, West Chester, PA (US); Jeffrey G. Hunchar, West Chester, PA (US); Kevin C. Somerville, Hockessin, DE (US)

(73) Assignee: Arkion Life Sciences LLC, Wilmington, DE (US)

( * ) Notice: Subject to any disclaimer, the term of this patent is extended or adjusted under 35 U.S.C. 154(b) by 0 days.

(21) Appl. No.: 10/185,590

(22) Filed: Jun. 27, 2002

(65) Prior Publication Data

US 2004/0000272 A1 Jan. 1, 2004

(51) Int. Cl.$^7$ ............................................. A01K 29/00
(52) U.S. Cl. .......................................... 119/174; 426/2
(58) Field of Search ............. 119/6.8, 174; 424/159.1, 424/130.1, 157.1; 426/2

(56) References Cited

U.S. PATENT DOCUMENTS

| | | | | |
|---|---|---|---|---|
| 4,458,630 A | * | 7/1984 | Sharma et al. ............... | 119/6.8 |
| 4,710,377 A | * | 12/1987 | Schenkel et al. ......... | 424/267.1 |
| 4,748,018 A | * | 5/1988 | Stolle et al. .............. | 424/157.1 |
| 5,367,054 A | * | 11/1994 | Lee ........................... | 530/359 |
| 5,397,569 A | * | 3/1995 | Whitfill et al. ........... | 424/178.1 |
| 5,420,253 A | * | 5/1995 | Emery et al. ............... | 530/423 |
| 5,438,954 A | * | 8/1995 | Phelps et al. ................ | 119/6.8 |
| 5,725,873 A | | 3/1998 | Cook et al. ................. | 424/442 |
| 5,807,551 A | * | 9/1998 | Reynolds ................. | 424/159.1 |
| 5,827,517 A | | 10/1998 | Cook et al. .............. | 424/139.1 |
| 5,989,584 A | * | 11/1999 | Cook et al. ................. | 424/442 |
| 6,086,878 A | | 7/2000 | Adalsteinsson et al. .. | 424/157.1 |

FOREIGN PATENT DOCUMENTS

| | | | | |
|---|---|---|---|---|
| US | WO9406904 | * | 3/1994 | |
| US | WO9503813 | * | 2/1995 | |

* cited by examiner

*Primary Examiner*—Charles T. Jordan
*Assistant Examiner*—Judith A. Nelson
(74) *Attorney, Agent, or Firm*—RatnerPrestia

(57) ABSTRACT

A method for supplementing new antibody or adding additional titer of an already present antibody into the circulating system in a newborn by feeding antibody to the newborn within the first few days of its life. The antibody is preferably obtained from the egg of an immunized mother and fed to the newborn within the first 24 hours of its life.

14 Claims, No Drawings

SUPPLEMENTED ANTIBODY FEED TO ENTER THE CIRCULATING SYSTEM OF NEWBORNS

FIELD OF THE INVENTION

The invention relates to a method for supplementing antibodies into the circulating system of a newborn. More specifically, the invention relates to a method for supplementing new or adding additional titer of antibody into the circulating system in a newborn by feeding antibody to the newborn within the first few days of its life.

BACKGROUND OF THE INVENTION

In certain species, antibodies are transferred to the fetus inutero through the placenta or to the developing embryo through the yolk sac. In other species, such transfer does not occur. This is compensated for, usually, by post partum ingestion of high antibody concentration from colostrum. Horses, cattle, sheep, pigs and dogs, among many others, are species in which passive immunity in the newborn is acquired by way of the colostrum. Antibodies from the colostrum are absorbed through the intestinal tract of the newborn, in most cases during the first 24 hours of life only. Because it is essential that the newborn animal receive all the passive immunity available to protect it during early life, efforts should be made to provide the necessary colostrum as soon as possible after birth; antibodies are absorbed at a decreasing rate even during the first 24 hours. The newborn animal is subject to infection until the antibodies are absorbed.

Of primary concern for a mammal at birth is whether it receives a sufficient amount of colostrum. Colostrum is the mammal's first milk and contains a high concentration of immunoglobulins (antibodies). These antibodies are used to protect the animal from disease and infection. Prior to lactation the mammal secretes colostrum during the first 24–48 hours following birth. The nursing mammal acquires the protective antibodies through the colostrum. This process is known as passive transfer. Passive transfer of antibodies and immune factors in colostrum helps compensate for the nursing newborn's immature immune system and provides the nursing animal with immunity to many serious bacteria and viruses.

Gastrointestinal tract absorption of colostrum begins to decrease after 12 hours, with minimal absorption occurring 24 hours after birth. It is therefore essential that an animal receive colostrum during this time initial 12–24 hours.

Lack of passive immunity during the early stages of life can be seen in the case of orphaned animals. In equine, for example, when a foal is orphaned and does not receive colostrum during the first 24 hours, 2–4 liters of blood plasma may be administered intravenously to supply the needed antibodies. Without either colostrum or plasma, however, foals will have insufficient antibody protection and will most likely succumb to infection. This is known as "failure of passive transfer" (FPT).

In non mammalian animal species such as avians, reptiles, fish and amphibians, passive transfer of antibody occurs through the egg yolk. Exposure of the mother to various antigens (eg. bacteria and viruses) will determine what antibodies will collect in the egg yolk and be available to the hatchling. Like colostrum, antibodies that are gained through passive transfer in the egg yolk are generally short lived because the transferred antibodies survive in the circulation for only a few weeks before they are degraded and removed. This does not minimize their importance to the animal since these passively transferred antibodies are protective in nature until the animal's immune system matures sufficiently to provide its own protection.

Similar to mammals, antibodies have been injected into young avians, and even into the yolk of an egg and have been successful in improving the antibody levels and profile. To date, however, no evidence can be found to suggest any success by feeding antibodies to non-nursing neonates or non mammalian species for the purpose of supplementing circulating antibody titer.

SUMMARY OF THE INVENTION

In one aspect the invention is directed to a method for supplementing an antibody into the circulating system of a hatchling, the method comprising feeding an egg product to said hatchling within the first 24 hour period after the hatchling is hatched.

In a second aspect the invention is directed to a method for increasing the titer of an antibody in the circulating system of a hatchling, the method comprising feeding an egg product to said hatchling within the first 24 hour period after the hatchling is hatched.

In an additional aspect the invention is directed to a method for generating systemic immunity in a hatchling, the method comprising feeding an egg product to said hatchling within the first 24 hour period after the hatchling is hatched.

DETAILED DESCRIPTION OF THE INVENTION

Definitions

The term "hyperimmunization" means exposure to one or more antigens such that an immune response is elevated and maintained above the natural unexposed state.

The terms "egg" or "egg product" each mean any whole egg (table, hyperinmunized or otherwise) or any product or fraction derived therefrom.

The terms "hyperimmune egg" or "hyperimmune egg product" each mean whole egg or any product or fraction derived therefrom, obtained from an egg producing animal maintained in a hyperimmune state.

The term "hatchling" refers to any animal that has recently been hatched from an egg.

The term "circulating system" refers to any of serum, plasma, tissues, marrow or organs of an animal.

The term "non-nursing animal" refers to any animal not currently acquiring antibody in its circulating system by directly ingesting milk or colostrum from a maternal animal of the same species.

The term "immunogen" means a substance that is able to induce a humoral antibody and/or cell-mediated immune response rather than immunological tolerance. The term signifies the ability to stimulate an immune response as well as react with the products of it, e.g., antibody.

The term "animal" means the animal kingdom definition.

The Invention

It is our finding that when hatchlings less than 24 hours post-hatch are fed, orally, a preparation of concentrated egg yolk, antibody originating from the egg yolk can be found in the circulating system of these birds. It is theorized that the antibody preparation can originate from any source and fed to an animal soon after birth to supplement antibody in the circulating system of such animal. It is preferred that the antibody be obtained from an egg or from milk of an animal that has been hyperimmunized with at least one antigen. It is alternately preferred that the antibody be purified, synthesized via fermentation or concentrated from egg or milk and fed to hatchlings, including birds, amphibians, reptiles, and fish or any other animal developing outside the mother animal during the first 12–24 hours post hatch or after birth.

As it is clear that circulating antibodies can be found in the serum of newly hatched hatchlings as result of passive immunity from egg yolk provided by the mother. It is the inventor's position that the oral feeding of antibodies during the early stages of life can be used to further supplement the systemic immunity obtained from the egg yolk. As a result it is possible to add to the length of time that systemic immunity can be generated in a hatchling post hatch and supplement additional antibodies that the mother may not have provided. The half-life of maternal antibody is defined as the time required for half of the antibody present in the circulation to be depleted. If the total amount of specific antibody in the circulation can be increased by feeding, then it follows that when the first half-life depletion occurs, there is more antibody remaining to perform its protective function than would be found if no supplemental antibody were provided to the circulation of the neonate.

The supplemented antibody can be used in a variety of ways. For example, supplemented antibody may be used to add to the titer of an antibody already circulating. On the other hand, the supplemented antibody may be used to provide antibody that is not present in the circulation. Supplemented antibody can further be used to design a profile of circulating antibody to meet the needs of the animal in the specific environment that it is bred or resides. This is important as animal production challenges can vary from location to location within the same company.

While it is preferred that the antibody(s) be obtained from a hyperimmunized avian or bovine, it is inventors' position that the antibody(s) can be obtained from any source.

Preparation Of Hyperimmune Egg or Milk Product:

It is important to keep in mind that the hyperimmunization process can be performed with either avians, whereby the egg contains the desired antibody or IgY profile resulting from the hyperimmunization process, or with bovine whereby the milk contains the desired antibody or IgY profile resulting from the hyperimmunization process. The below description is limited to hyperimmunization of avians, although the same concept is applicable to the hyperimmunization of bovine and the collection of their hyperimmune milk.

The hyperimmune egg product can be produced by any egg-producing animal. It is preferred that the animal be a member of the class Aves or, in other words, an avian. Within the class Aves, domesticated fowl are preferred, but other members of this class, such as turkeys, ducks, and geese, are a suitable source of hyperimmune egg product.

The hyperimmune egg product is preferably obtained from laying hens vaccinated with one or more immunogens. It is submitted that any immunogen or collection of immunogens can be used in the hyperimmunization process of this invention.

When such egg-producing animals are brought to a specific state of immunization by means of, for example, periodic booster administrations of specifically chosen antigens, the animals will produce eggs that will contain the desired antibody or IgY profile.

Having knowledge of the requirement for developing and maintaining a hyperimmune state, it is within the skill of the art to vary the amount of immunogen administered, depending on the egg-producing animal genera and strain employed, in order to maintain the animal in the hyperimmune state.

Alternative modes of hyperimmunizing egg producing animals can be used which, in place of immunogenic vaccines, include the use of genetic vaccines. In particular, any DNA construct (generally consisting of a promoter region and an immunogen encoding sequence) will trigger an immune response. Genetic vaccines consist of immunogen-coding vectors, fragments of naked DNA, plasmid DNA, DNA-RNA antigens, DNA-protein conjugates, DNA-liposome conjugates, DNA expression libraries, and viral and bacterial DNA delivered to produce an immune response. Methods of DNA delivery include particle bombardment, direct injection, viral vectors, liposomes and jet injection, among others. When applying these delivery methods, much smaller quantities may be necessary and generally result in more persistent immunogen production. When using such genetic processes, the preferred method for introducing DNA into avians is through intramuscular injection of the DNA into the breast muscle.

The process of spray drying the pasteurized liquid egg minimizes damage to the antibodies and immune modulators in the egg, resulting in a product that has a high nutrient value and is capable of conferring passive protection to opportunistic enteric infections and appears capable of decreasing inflammation. Antibodies, as a group, are especially resistant to destruction by normal enzymes, and upon oral consumption, a significant fraction will pass through the gastrointestinal tract intact and active. Numerous studies report that orally consumed antibodies offer protection against specific enteric agents.

Preferred Hyperimmunization Procedure:

The following list of steps is an example of a preferred procedure used to bring an egg-producing animal to a heightened state of immunity:

1. Selecting one or more immunogens.
2. Eliciting an immune response in the egg-producing animal by primary immunization.
3. Administering booster vaccines of immunogens of appropriate dosage to induce and maintain the hyperimmune state.

Step 1: Any immunogens or combination of immunogens may be employed as a vaccine. The immunogens can be bacterial, viral, protozoan, fungal, cellular, or any other substances to which the immune system of an egg-producing animal will respond. The critical point in this step is that the immunogen(s) must be capable of inducing immune and hyperimmune states in the egg-producing animal.

Step 2: The vaccine can be either a killed or live-attenuated vaccine and can be administered by any method that elicits an immune response. It is preferred that immunization be accomplished by administering the immunogens through intramuscular injection. The preferred muscle for injection in an avian is the breast muscle. Other methods of administration that can be used include intravenous injection, intraperitoneal injection, intradermal, rectal suppository, aerosol or oral administration. When DNA techniques are used for the hyperimmunization process, much smaller quantities are required, generally 1–100 micrograms.

It can be determined whether the vaccine has elicited an immune response in the egg-producing animal through a number of methods known to those having skill in the art of immunology. Examples of these include enzyme-linked immunosorbent assays (ELISA), tests for the presence of antibodies to the stimulating antigens, and tests designed to evaluate the ability of immune cells from the host to respond to the antigen. The minimum dosage of immunogen necessary to induce an immune response depends on the vaccination procedure used, including the type of adjuvants and formulation of immunogen(s) used as well as the type of egg-producing animal used as the host.

Step 3: The hyperimmune state is preferably induced and maintained in the target animal by repeated booster administrations of an appropriate dosage at fixed time intervals. The time intervals are preferably 2–8 week intervals over a period of 6–12 months. Dosage is preferably 0.05–5 milligrams of the immunogenic vaccine. However, it is essential that the booster administrations do not lead to immune tolerance. Such processes are well known in the art.

It is possible to use other hyperimmunization maintenance procedures or combination of procedures, such as, for example, intramuscular injection for primary immunization and intravenous injection for booster injections. Further procedures include simultaneously administering microencapsulated and liquid immunogen, or intramuscular injection for primary immunization, and booster dosages by oral administration or parenteral administration by microencapsulation means. Several combinations of primary and hyper-immunization are known to those skilled in the art.

Processing and Administration Of Hyperimmune Egg:

Once the egg-producing animals have been sufficiently hyperimmunized, it is preferred that the eggs from these animals are collected and processed to produce a hyperimmune egg product. Subsequently, the hyperimmune egg product can be administered to the subject.

The egg and/or egg product of the present invention is administered to a newborn animal by any means that results in the supplementation of antibodies in the circulation of the animal and resultant systemic immunity. It is preferred that administration occur by directly feeding the egg or any effective derivative of the egg. Egg and egg yolk are natural food ingredients and are non-toxic and safe.

One preferred method for preparing the egg involves drying the egg into an egg powder. Although various methods are known for drying eggs, spray drying is a preferred method. The process of spray drying eggs is well known in the art.

In an alternate embodiment, the hyperimmune egg is administered together with a food product containing several nutrients such as vitamins and minerals. Such nutrient-bearing foods are often in the form of a nutritional or dietary supplement so as to provide extra nutrients.

Further purification or concentration could provide more potent fractions of antibodies or elimination of undesirable components. Such further separation will provide for the ability to make encapsulated products and pharmaceutical type compositions with said egg or fraction thereof.

It is the inventors' finding that feeding of anywhere from 0.1 mg to 5 g of antibody or IgY per kilogram of animal weight is effective in supplementing antibodies in the circulating system of the animal. Duration and intensity of the treatment will depend upon the particular species and stage in life. The hyperimmune egg product is fed in any amount that results in circulating antibodies. For example, in some cases, daily amounts ranging from less than one to several whole, hyperimmune eggs (or hyperimmune egg products containing the equivalent of less than one to several whole, hyperimmune eggs) can be fed to the hatchling or other newborn depending on the particular species and stage in life. More potent fractions of antibodies can be separated and concentrated by methods well-known in the art, from several hundred eggs.

The advantageous properties of this invention can be observed by reference to the following examples which illustrate the invention.

EXAMPLES

Example 1

Confirmation of Passively Transferred Antibody in Serum of One Day Old Poults Fed Anti-*H. Pylori* Whole Cell Antigen IGY from Concentrated Whole Egg Protocol A ten fold concentrate of water soluable fraction of hyperimmune whole egg containing IgY antibodies against *Helicobactor pylori* whole cell antigen was prepared via acidified water dilution, centrifugation, and lyophilization. The reconstituted antibody was fed to 1 day old pouts by gavage with approximately 100 ul of liquid concentrate. Twelve poults were not fed anti *H. pylori* antibody for use as controls. Twenty four hours after being gavaged, the test and control poults were sacrificed, and blood samples obtained. The blood samples were allowed to coagulate, then centrifuged to obtain the serum. The presence of anti-*H. pylori* specific IgY in the serum was determined via ELISA assay using whole cell *H. pylori* antigen (Fitzgerald Industries) as the solid phase coating antigen. All samples were tested in duplicate. The mean and standard deviation of the OD of control samples was determined. The mean OD of each test sample was then determined, and compared to the mean OD of the control samples. A test sample with a mean OD greater than two standard deviations from the control samples was considerd positive for anti-*H. pylori* antibody.

The ELISA analysis was then repeated and positives were inhibited by adding whole cell *H. pylori* antigen to 10 ug/ml and incubating overnight at 4 C. prior to analysis. The inhibited positives were compared to the non-inhibited positives, and a percentage of inhibition was determined. Positive and negative control egg samples were also included and percentage of inhibition for these controls was also determined.

Conclusions

Nine of thirty two test samples (28%) resulted in mean Ods greater than two standard deviations above the mean of the controls. Five of thirty two test samples (16%) resulted in mean ODs greater than three standard deviations above the mean of the controls. The positive control was inhibitable by 29%, while negative control was not inhibitable. All nine of the positive test samples were inhibitable in a range of 10% to 52%, with four of the positive samples resulting in a percentage of inhibition greater than that of the positive control. None of the samples were completely inhibitable, which indicates that the concentration of the inhibiting *H. pylori* whole cell antigen may not have been optimal. However, partial inhibition, especially at percentages greater that the inhibition of the positive control indicates the presence of anti-*H. pylori* specific IgY in the serum of the treated poults.

Data

NOT INHIBITED SERA

|  | O.D.#1 | O.D.#2 | MEAN |
|---|---|---|---|
| Control 1 | 0.391 | 0.386 | 0.389 |
| Control 2 | 0.289 | 0.304 | 0.297 |
| Control 3 | 0.262 | 0.264 | 0.263 |
| Control 4 | 0.204 | 0.223 | 0.214 |
| Control 5 | 0.237 | 0.255 | 0.246 |
| Control 6 | 0.228 | 0.23 | 0.229 |
| Control 7 | 0.371 | 0.346 | 0.359 |
| Control 8 | 0.324 | 0.302 | 0.313 |
| Control 9 | 0.445 | 0.444 | 0.445 |
| Control 10 | 0.211 | 0.197 | 0.204 |
| Control 11 | 0.598 | 0.579 | 0.589 |
| Control 12 | 0.416 | 0.406 | 0.411 |

Control Mean=0.330

Control StDev=0.112

3×Control StDev+0.665

CV of Controls=33.9%

|  | O.D.#1 | O.D.#2 | MEAN |  | O.D.#1 | O.D.#2 | MEAN |
| --- | --- | --- | --- | --- | --- | --- | --- |
| Test 1 | 0.354 | 0.382 | 0.368 | | | | |
| Test 2 | 0.208 | 0.21 | 0.209 | | | | |
| Test 3 | 0.402 | 0.41 | 0.406 | | | | |
| Test 4 | 0.545 | 0.566 | 0.556 > 2 SD of controls | 0.388 | 0.387 | 0.388 |
| Test 5 | 0.38 | 0.4 | 0.390 | | | | |
| Test 6 | 0.449 | 0.424 | 0.437 | | | | |
| Test 7 | 0.468 | 0.482 | 0.475 > 2 SD of Controls | 0.402 | 0.38 | 0.391 |
| Test 8 | 0.654 | 0.684 | 0.669 > 3 SD of Controls | 0.604 | 0.604 | 0.604 |
| Test 9 | 0.389 | 0.375 | 0.382 | | | | |
| Test 10 | 0.234 | 0.244 | 0.239 | | | | |
| Test 11 | 0.316 | 0.3 | 0.308 | | | | |
| Test 12 | 0.442 | 0.464 | 0.453 | | | | |
| Test 13 | 0.46 | 0.452 | 0.456 | | | | |
| Test 14 | 0.511 | 0.546 | 0.529 > 2 SD of Controls | 0.428 | 0.428 | 0.428 |
| Test 15 | 0.417 | 0.405 | 0.411 | | | | |
| Test 16 | 0.693 | 0.643 | 0.668 > 3 SD of Controls | 0.514 | 0.523 | 0.519 |
| Test 17 | 0.363 | 0.386 | 0.375 | | | | |
| Test 18 | 0.27 | 0.276 | 0.273 | | | | |
| Test 19 | 1.199 | 1.242 | 1.221 > 3 SD of Controls | 0.59 | 0.57 | 0.580 |
| Test 20 | 0.416 | 0.424 | 0.420 | | | | |
| Test 21 | 0.413 | 0.415 | 0.414 | | | | |
| Test 22 | 0.194 | 0.207 | 0.201 | | | | |
| Test 23 | 0.335 | 0.342 | 0.339 | | | | |
| Test 24 | 0.908 | 0.926 | 0.917 > 3 SD of Controls | 0.603 | 0.582 | 0.593 |
| Test 25 | 0.199 | 0.183 | 0.191 | | | | |
| Test 26 | 0.295 | 0.293 | 0.294 | | | | |
| Test 27 | 0.243 | 0.308 | 0.276 | | | | |
| Test 28 | 0.393 | 0.369 | 0.381 | | | | |
| Test 29 | 0.27 | 0.284 | 0.277 | | | | |
| Test 30 | 0.446 | 0.522 | 0.484 > 2 SD of Controls | 0.291 | 0.284 | 0.288 |
| Test 31 | 0.206 | 0.214 | 0.210 | | | | |
| Test 32 | 0.722 | 0.759 | 0.741 > 3 SD of Controls | 0.598 | 0.557 | 0.578 |
| Negative Control Egg | 0.387 | 0.366 | 0.377 | | 0.343 | 0.408 | 0.376 |
| Positive Control Egg | 1.632 | 1.632 | 1.632 > 3 SD of Controls | 1.17 | 1.154 | 1.162 |

What is claimed is:

1. A method for generating systemic immunity in a hatchling, the method comprising orally administering a composition comprising a dried egg product to said hatchling within the first 24 hour period after the hatchling is hatched, wherein the egg product is obtained from an egg-producing animal that has been hyperimmunized with an immunogenic vaccine comprising immunogens that do not cause avian gastrointestinal disease.

2. The method of claim 1, wherein the antibody is not present in the circulating system of the hatchling prior to the feeding of the egg product.

3. The method of claim 1 wherein the immunogenic vaccine comprises at least one antigen selected from the group consisting of bacterial, viral, protozoan, fungal, and cellular antibodies and mixtures thereof.

4. The method of claim 1 wherein the egg product comprises an effective concentration of IgY.

5. The method of claim 1 wherein the hatching is selected from the group consisting of avians, reptiles, fish and amphibians.

6. A method for increasing the titer of an antibody in the circulating system of a hatchling, the method comprising orally administering a composition comprising a dried egg product to said hatching within the first 24 hour period after the hatching is hatched, wherein the egg product is obtained from an egg-producing animal that has been hyperimmunized with an immunogenic vaccine comprising immunogens that do not cause avian gastrointestinal disease.

7. The method of claim 6 wherein the immunogenic vaccine comprises at least one antigen selected from the group consisting of bacterial, viral, protozoan, fungal, and cellular antibodies and mixtures thereof.

8. The method of claim 6 wherein the egg product comprises an effective concentration of IgY.

9. The method of claim 6 wherein the hatching is selected from the group consisting of avians, reptiles, fish and amphibians.

10. A method for supplementing an antibody into the circulating system of a hatching, the method comprising orally administering a composition comprising a dried egg product to said hatchling within the first 24 hour period after the hatchling is hatched, wherein the egg product is obtained from an egg-producing animal that has been hyperimmunized with an immunogenic vaccine comprising immunogens that do not cause avian gastrointestinal disease.

11. The method of claim 10 wherein the antibody is not present in the circulating system of the hatchling prior to the feeding of the egg product.

12. The method of claim 10 wherein the immunogenic vaccine comprises at least one antigen selected from the group consisting of bacterial, viral, protozoan, fungal, and cellular antibodies and mixtures thereof.

13. The method of claim 10 wherein the egg product comprises an effective concentration of IgY.

14. The method of claim 10 wherein the hatchling is selected from the group consisting of avians, reptiles, fish and amphibians.

* * * * *